United States Patent [19]

Flank

[11] 3,758,539
[45] Sept. 11, 1973

[54] OFFRETITE SYNTHESIS FROM MINERALS
[75] Inventor: William H. Flank, Broomall, Pa.
[73] Assignee: Air Products and Chemicals Inc., Philadelphia, Pa.
[22] Filed: Mar. 9, 1971
[21] Appl. No.: 122,553

[52] U.S. Cl. ............... 252/455 Z, 423/118, 423/329
[51] Int. Cl. ............................................. B01j 11/40
[58] Field of Search .............................. 252/455 Z; 23/111–113; 208/DIG. 2

[56] References Cited
UNITED STATES PATENTS
3,578,398   5/1971   Jenkins .................................. 23/113
3,341,284   9/1967   Young .................................. 23/112 R
3,436,174   4/1969   Sand ...................................... 23/113
3,314,752   4/1967   Kerr ...................................... 23/113

Primary Examiner—C. F. Dees
Attorney—John R. Ewbank and R. Max Klevit

[57] ABSTRACT

A synthetic offretite having a capacity for sorbing benzene and other large molecules is prepared from an aqueous nutrient containing tetramethyl ammonium hydroxide, potassium hydroxide, and a suitable mixture of reactive aluminosilicate minerals, usually comprising sorptive silica.

3 Claims, No Drawings

OFFRETITE SYNTHESIS FROM MINERALS

BACKGROUND OF INVENTION

1. Field of Invention

This invention relates to crystalline zeolitic aluminosilicates synthesized in an alkaline medium containing reactive aluminosilicates derived from minerals such as clay or perlite.

2. Prior Art

Zeolite T, as described in U.S. Pat. No. 2,950,952, is characterized by X-ray diffraction data corresponding essentially to that of erionite which has small pore sorption characteristics resembling those of Zeolite T.

The powder technique for X-ray diffraction of erionite and offretite provide data which are nearly identical. Geologists have debated whether any alleged differences between erionite and offretite were structural or semantic. Bennett and Gard, in a letter to "Nature," volume 214, page 1005 (June 3, 1967), clarified the structural difference by pointing out that a staggering of building block components accounted for the small pore size in the erionite structure, whereas offretite was completely free from any staggering, and had large pores. Zeolite T was described as being a "disordered intergrowth of erionite and offretite." This "Nature" letter explained why the use of X-ray powder techniques was inadequate for distingushing samples of erionite and offretite and why single crystal techniques were necessary for distinguishing the structures by X-ray diffraction. The letter indicated that the relation between erionite and offretite resembled that between gmelinite and chabazite. The presence of impurities and/or faulting in offretite would be detectable by electron-diffraction streaking. The letter suggested that "fully ordered offretite could possibly be synthesized by careful choice of experimental conditions. Such a synthetic product would have valuable commercial applications." An article by Gard and Tait which was presented at the Second International Conference on Molecular Sieve Zeolites at Worcester in September, 1970, further clarified these relationships and described, among other things, their characterization and identification of a sample of natural unfaulted offretite.

British Pat. No. 1,188,043, related to Rubin application Ser. No. 717,977, filed Apr. 1, 1968 in the U.S. Patent Office, and assigned to Mobil Oil Corp., describes a synthesis of an unfaulted offretite by the controlled aging of an aqueous alkaline system featuring sodium hydroxide, potassium hydroxide and tetramethyl ammonium hydroxide, together with gelatinous alumina and gelatinous silicates. Although pure chemicals are convenient for use in certain laboratory experiments, the cost of the pure siliceous chemicals and the pure aluminaceous chemicals for the synthesis of offretite tended to discourage commercial development of synthetic offretite. There has been a long standing demand for a method of synthesizing large pore offretite from inexpensive sources of silica and/or alumina.

SUMMARY OF THE INVENTION

In accordance with the present invention, an aluminosilicate mineral is treated in a suitable manner (e.g., calcining to provide a reactive aluminosilicate, which is employed in a nutrient comprising tetramethyl ammonium hydroxide and potassium hydroxide for conversion to fault-free offretite. Sorptive silica, such as obtained by calcining diatomaceous earth, or derived for potassium silicate, is employed to bring the $SiO_2/Al_2O_3$ unit mol ratio from that of the reactive mineral to a value near the magnitude of 20.

DESCRIPTION OF PREFERRED EMBODIMENTS

The invention is clarified by reference to a plurality of examples.

EXAMPLE I

A nutrient was prepared by mixing:
KOH(0.236 mol) — 13.2g
$(CH_3)_4NOH \cdot 5H_2O$ (0.1 mol) — 18.3g
meta kaolin (0.02 mol) — 4.4g
sorptive silica (0.4 mol) — 23.7g
$H_2O$ (5 mol) — 90.0g
In the nutrient, some of the unit mol ratios were:
$KOH/(CH_3)_4NOH$ — 2.36
TA (total alkali)/$Al_2O_3$ — 16.8
$SiO_2$/TA — 1.31
$H_2O$/TA — 14.9
$SiO_2/Al_2O_3$ — 22.0
$(CH_3)_4NOH$/TA — 0.3
KOH/TA — 0.7

Meta kaolin is prepared by calcining raw kaolin (alumino disilicate dihydrate) at a temperature removing substantially all of the hydrated water. Sorptive silica powder is defined as silica powder having a sufficiently large surface area to be readily soluble in aqueous alkali. The sorptive silica is desirably a calcined diatomaceous earth, but certain varieties of raw (uncalcined) diatomaceous earth are capable of dissolving in hot aqueous alkali (2 to 4 molar) to form alkali silicate (e.g., potassium trisilicate). Various types of sorptive silica are also marketed not as minerals, but as reactive silica. Pulverized silica gel has acceptable solubility, as has a Hi-Sil brand of sorptive silica, comprising silica and water.

The nutrient was quiescently aged at 100°C. for 3 days (72 hours) in a closed container. The aged mixture was filtered to provide a crude offretite composition as the filter cake. After a thorough washing, the purified offretite was dried and analyzed by X-ray diffraction, thus establishing the presence of 80 percent offretite in the product. The three major peaks of pure offretite provided the standards for the quantitative analysis of the offretite by X-ray diffraction.

The offretite in an aluminosilicate support was ion-exchanged into the predominantly ammonium form. Such supported ammonium offretite was heated in a stream of vapor mixture of ammonia and steam at temperatures slowly rising to 600°C. to provide an activated offretite effective in sorbing large amounts of cyclohexane, thus establishing the substantial freedom from erionite, Zeolite L, and/or other impurities. Minor amounts of any of several impurities destroy the large pore characteristics of offretite, thus impairing its utility as a catalyst, sorbent for aromatic chemicals, and/or as a molecular sieve diffusion membrane. The supported hydrogen offretite is advantageously employed as a hydrocarbon conversion catalyst for reactions such as dealkylation of alkyl aromatics, redistribution of alkyl aromatics, hydrocracking, cracking, and isomerization.

EXAMPLE II

An aqueous nutrient was prepared consisting of:
KOH (0.23 mol) — 13.2g (CH$_3$)$_4$NOH·5H$_2$O (0.1 mol) — 18.3g
Expanded perlite (0.02 mol Al$_2$O$_3$ and 0.128 mol SiO$_2$) — 11.1g
Sorptive silica (0.299 mol) — 17.6g
H$_2$O (5 mol) — 90.0g Perlite is a volcanic potassium sodium aluminosilicate glass containing about 17.4% Al$_2$O$_3$, so that 588g of expanded perlite contains 1 mol of Al$_2$O$_3$. The expanded perlite was treated as if 588g corresponded to a mol in Al$_2$O$_3$ calculations. The expanded perlite contained 69.5% SiO$_2$ so that 86.5g corresponded to a mol in SiO$_2$ calculations.

KOH/(CH$_3$)$_4$NOH — 2.36
TA/Al$_2$O$_3$ — 17.7
SiO$_2$/TA — 1.26
H$_2$O/TA — 14.9
SiO$_2$/Al$_2$O$_3$ — 22.2
(CH$_3$)$_4$NOH/TA — 0.3
KOH/TA — 0.7

The expanded perlite and sorptive silica were dispersed in the aqueous alkali by power stirring to provide a slurry which was transferred to a sealed container for quiescent aging at 100°C. for about 3 days. The aged composition was dispersed in water, filtered, and the filter cake washed and dried. The thus prepared powder contained 40 percent offretite according to the standard analysis by intensity of the peaks on X-ray diffraction. Thermal activation of the ammonium-exchanged powder provided the large pore molecular sieve characteristics of a supported hydrogen offretite.

EXAMPLE III

Kaolin powder (catalytic grade substantially free from Fe$_2$O$_3$ and containing small amounts of TiO$_2$) was calcined briefly at about 1,000°C. to provide a product which when analyzed in Differential Thermal Analysis instruments, had less than 15 percent, desirably less than about 3 percent, and usually less than 1 percent of the exotherm of metakaolin. The effects of 0.1 to 15 percent residual exotherm in de-exothermed kaolin upon reactivity with aqueous alkali have been clarified in previous literature, which also emphasizes control of the calcination to prevent development of significant amounts of X-ray detectable mullite in the de-exothermed kaolin.

An aqueous solution was prepared consisting of:
KOH (0.268 mol) — 15g
(CH$_3$)$_4$NOH·5H$_2$O (0.11 mol) — 20g
H$_2$O (5.55 mol) — 100g Power stirring permitted dispersion of:
de-exothermed kaolin (0.0225 mol) — 5.0g
hydrated (11 percent) sorptive silica (0.375 mol SiO$_2$) — 25.0g to provide a batter-type slurry. The unit mol ratios for the nutrient were:
KOH/(CH$_3$)$_4$NOH — 2.36
TA/Al$_2$O$_3$ — 16.8
SiO$_2$/TA — 1.11
H$_2$O/TA — 14.7
SiO$_2$/Al$_2$O$_3$ — 18.7
(CH$_3$)$_4$NOH/TA — 0.3
KOH/TA — 0.7

The batter was aged quiescently in a sealed container at 100°C. for 3 days to provide a product which, after washing and drying of the filter cake, contained 35 percent large pore offretite.

EXAMPLE IV

A nutrient was prepared using the proportions and procedure of Example I, but as a batch 10 times as large. The powdered offretite product was ion-exchanged 10 times in hot aqueous ammonium nitrate, and the ion-exchanged powder was found to contain 80 percent ammonium offretite by X-ray diffraction.

Raw kaolin (19 parts) was blended with 1 part of the thus prepared supported ammonium offretite. Water was added to provide an extrudate which was sliced into pellets. After steaming at 1,350°F., the pellets were tested as a cracking catalyst at CAT-D-1 conditions (described in U.S. Pat. No. 3,455,842). A similar catalyst is prepared from kaolin containing 4 percent ammonium offretite prepared from pure chemicals, and is employed as a control. Notwithstanding the high proportion of inert kaolin diluent, the catalysts performed better than some of the cracking catalysts employed industrially shortly prior to the introduction of supported crystalline cracking catalysts, as indicated in Table 1.

TABLE 1

|  | Control | Example |
|---|---|---|
| Vol.% gaso. | 20.4 | 20.4 |
| Wt.% coke | 1.2 | 1.2 |
| Wt.% gas | 6.9 | 6.9 |
| Gas Gravity | 1.33 | 1.33 |

By a variety of tests, the usefulness of the mineral-derived supported offretite as a substitute for offretite derived from costly reagent grade chemicals is established.

EXAMPLE V

A hydrocracking catalyst was prepared by blending 2 parts of raw kaolin and 1 part of the supported ammonium offretite of Example IV, and slurrying the mixture in a 2.55 percent solution of Pd(NH$_3$)$_4$(NO$_3$)$_2$ for 2 hours, drying the powder, and compressing the powder into pellets in a tabletting press. The pellets were heated slowly in air to 900°F. and then in a hydrogen stream to 1,050°F. Analysis of the hydrocracking catalyst indicated 1 percent palladium and 30 percent hydrogen offretite. The catalyst is highly effective in the hydrocracking of gas oil to gasoline.

By a series of tests, it is established that the following ranges of mol ratios should be maintained to achieve large pore offretite in the product.

|  | Operable | Desirable | Preferred |
|---|---|---|---|
| KOH/(CH$_3$)$_4$NOH | 0.25–19 | 2–2.8 | 2.4 |
| TA/Al$_2$O$_3$ | 1.6–25 | 14–20 | 16.8 |
| SiO$_2$/TA | 1–3.75 | 1.1–1.5 | 1.3 |
| H$_2$O/TA | 10–70 | 12–18 | 15 |
| SiO$_2$/Al$_2$O$_3$ | 6–25 | 18–24 | 22 |
| (CH$_3$)$_4$NOH/TA | 0.05–0.8 | 0.22–0.34 | 0.3 |
| KOH/TA | 0.02–0.95 | 0.66–0.78 | 0.7 |

The nutrient should be aged quiescently at a temperature within a range from 70° to 120°C., desirably 90° to 110°C., and preferably about 100°C. for a period from about 1 to about 9 days, desirably 2 to 4 days, and preferably for 3 days. The presence of an adequate amount of the (CH$_3$)$_4$NOH is particularly important in attaining the large pore offretite structure and minimizing formation of Zeolite L, or erionite, or other impurities, small amounts of which convert the product into a structure having small or blocked pores. The approximately 1.5 molar concentration of the alkali trisilicate is also of significance, as is the presence in the nutrient of a larger unit ratio of $SiO_2/Al_2O_3$ than expected in the offretite product.

EXAMPLE VI

An aqueous solution of a mixture of about 7 mols of potassium trisilicate

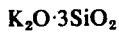

and about 3 mols of tetramethyl ammonium trisilicate

is prepared in a concentration of about 1.5 moles of trisilicate per liter, and the solution is heated to about 100°C. Such solutions are desirably prepared by dispersing calcined diatomaceous earth in the hot aqueous alkali, followed by digestion and filtration, but other sources of sorptive silica may be employed.

Said solution of potassium tetramethyl ammonium trisilicate is employed as the solution in which a minor amount of calcined mineral is dispersed, aged for 3 days at 100°C., and the recrystallized product recovered by filtration. The recovered solids are washed, ion-exchanged with ammonium nitrate, and calcined to provide a supported hydrogen offretite having large pores adapted to sorb benzene. The calcined minerals thus recrystallized into large pore offretite included: metakaolin (yielding product containing 80 percent offretite); de-exothermed kaolin (product containing 35 percent offretite); and perlite (product containing 40 percent offretite). Other calcined alumino-silicates transformable into other zeolites by hot recrystallization in aqueous alkaline silicate might also be transformed into offretite by dispersion in the specified potassium tetramethyl ammonium trisilicate solution.

In synthesizing zeolite from mixtures of alkaline materials, conventional practice has been to include significant proportions of sodium hydroxide in the nutrient even when modifying amounts of a suitable quaternary ammonium hydroxide and/or inorganic hydroxide was employed. The present invention features a departure from such practice by excluding significant proportions of sodium hydroxide from the nutrient and controlling the desired synthesis by the potassium tetramethyl ammonium trisilicate concentration. Minor amounts of sodium, such as derived from the perlite, do not prevent the operativeness of the offretite synthesis.

Various modifications of the invention are possible without departing from the scope of the claims.

The invention claimed is:

1. The method of preparing a catalytically useful composition comprising offretite in an inorganic support which method includes the steps of:
   preparing an aqueous nutrient containing potassium hydroxide and tetramethyl ammonium hydroxide as the total alkali, and a mixture of calcined minerals selected from the group consisting of expanded perlite and sorptive silica, de-exothermed kaolin and sorptive silica, and meta kaolin and sorptive silica, the molar unit ratio of $SiO_2/Al_2O_3$ in said nutrient being within a range from about 18 to 24, and the molar unit ratio of total alkali to alumina in such nutrient being within a range from about 14 to 20;
   subjecting said nutrient to aging at a temperature within a range from about 90°C. to about 110°C. for from about 1 to about 3 days;
   filtering the thus aged nutrient to recover a crude offretite composition; and
   washing and purifying said offretite composition.

2. The method of claim 1 in which the molar unit ratio of potassium hydroxide to tetramethyl ammonium hydroxide is within a range from about 2.0 to about 2.8.

3. The method of claim 2 in which the unit mol ratio of water to total alkali is from about 12 to about 18.

* * * * *